United States Patent
Wu et al.

(10) Patent No.: US 11,528,671 B2
(45) Date of Patent: *Dec. 13, 2022

(54) FRAME STRUCTURE TO SUPPORT LONG DISTANCE TRANSMISSION

(71) Applicant: Huawei Technologies Co., Ltd., Shenzhen (CN)

(72) Inventors: Tao Wu, Shenzhen (CN); Yan Xin, Kanata (CA); Min Yan, Shenzhen (CN); Sheng Sun, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/494,949

(22) Filed: Oct. 6, 2021

(65) Prior Publication Data

US 2022/0030528 A1     Jan. 27, 2022

Related U.S. Application Data

(63) Continuation of application No. 15/061,831, filed on Mar. 4, 2016, now Pat. No. 11,160,039.

(51) Int. Cl.
*H04L 5/00* (2006.01)
*H04W 52/52* (2009.01)

(52) U.S. Cl.
CPC .............. *H04W 52/52* (2013.01); *H04L 5/005* (2013.01)

(58) Field of Classification Search
CPC ...... H04L 5/005; H04L 5/0053; H04W 52/52; H04W 84/12; H04B 7/0452
See application file for complete search history.

(56) References Cited

U.S. PATENT DOCUMENTS

| | | | |
|---|---|---|---|
| 8,238,316 B2 | 8/2012 | Stacey et al. |
| 8,265,096 B2 | 9/2012 | Zheng et al. |
| 2006/0291373 A1 | 12/2006 | Nakao |
| 2009/0092067 A1 | 4/2009 | Sudarshan et al. |
| 2010/0142559 A1 | 6/2010 | Hu |
| 2011/0051705 A1 | 3/2011 | Jones et al. |
| 2011/0150148 A1 | 6/2011 | Son et al. |
| 2011/0170627 A1 | 7/2011 | Kwon et al. |
| 2011/0194545 A1 | 8/2011 | Yang et al. |
| 2013/0301625 A1 | 11/2013 | Thoukydides et al. |
| 2014/0153507 A1 | 6/2014 | Yang et al. |

(Continued)

FOREIGN PATENT DOCUMENTS

| | | |
|---|---|---|
| CN | 101374135 A | 2/2009 |
| CN | 102148661 A | 8/2011 |

(Continued)

OTHER PUBLICATIONS

IEEE Std 802.11ad-2012, Part 11: Wireless LAN Medium Access Control (MAC) and Physical Layer (PHY) Specifications, Amendment 3: Enhancements for Very High Throughput in the 60 GHz Band, IEEE Computer Society, Dec. 28, 2012, 628 pages.

(Continued)

*Primary Examiner* — Abdelillah Elmejjarmi
(74) *Attorney, Agent, or Firm* — Slater Matsil, LLP

(57) ABSTRACT

A method is described for providing extended wireless coverage. The method includes transmitting, by a station (STA), at least a first frame including one or more short training fields (STFs) and a legacy STF, each of the one or more STFs carrying a sequence of symbols that is orthogonal to a sequence of symbols carried by the legacy STF.

21 Claims, 8 Drawing Sheets

(56) References Cited

U.S. PATENT DOCUMENTS

| | | |
|---|---|---|
| 2014/0362935 A1 | 12/2014 | Porat et al. |
| 2015/0236831 A1 | 8/2015 | Kang et al. |
| 2015/0237178 A1 | 8/2015 | Zhang |
| 2016/0105304 A1 | 4/2016 | Kwon |
| 2016/0164800 A1 | 6/2016 | Eitan et al. |
| 2016/0165607 A1 | 6/2016 | Hedayat |
| 2016/0242205 A1 | 8/2016 | Chen et al. |
| 2017/0078008 A1 | 3/2017 | Kasher et al. |
| 2017/0359825 A1 | 12/2017 | Seok |

FOREIGN PATENT DOCUMENTS

| | | |
|---|---|---|
| CN | 102714631 A | 10/2012 |
| CN | 102714643 A | 10/2012 |
| WO | 2011031454 A1 | 3/2011 |

OTHER PUBLICATIONS

Sun, R., et al., "IEEE 802.11 TGay Use Cases", IEEE 802.11-2015/0625r3, Sep. 2015, 24 pages.

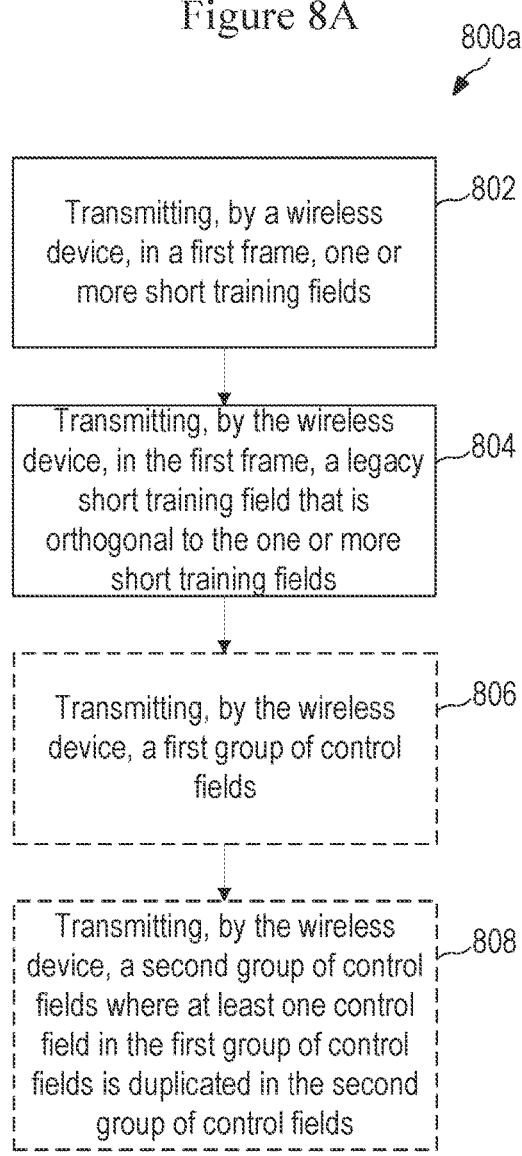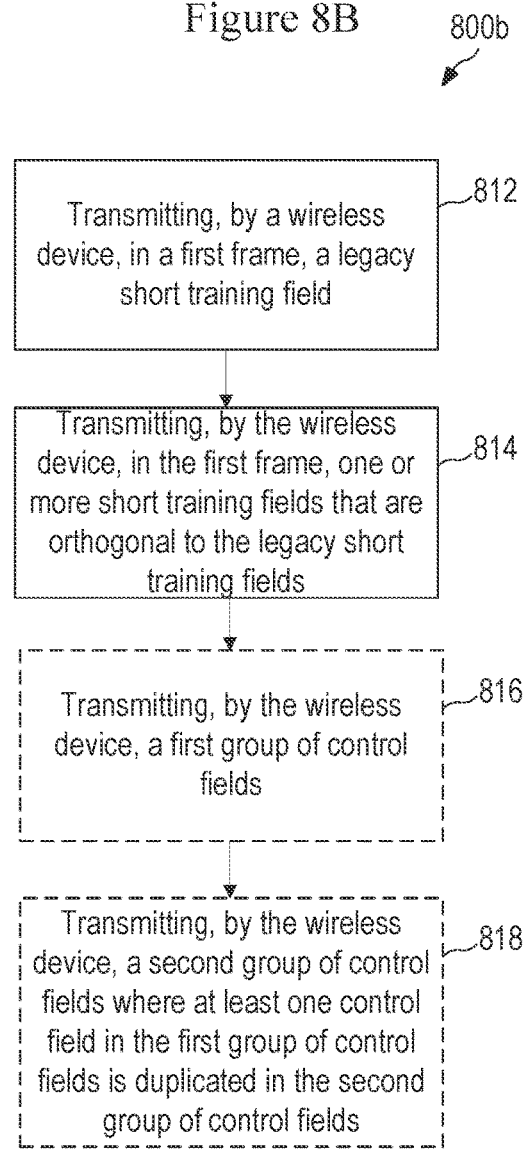

FRAME STRUCTURE TO SUPPORT LONG DISTANCE TRANSMISSION

CROSS-REFERENCE TO RELATED APPLICATIONS

This application is a continuation of U.S. application Ser. No. 15/061,831 filed on Mar. 4, 2016, entitled "Frame Structure to Support Long Distance Transmission," which is hereby incorporated by reference herein in its entirety.

TECHNICAL FIELD

The present invention relates generally to wireless communications, and in particular embodiments, to a frame structure to support long distance transmission.

BACKGROUND

Wireless signals communicated using carrier frequencies between 30 Gigahertz (GHz) and 300 GHz are commonly referred to as millimeter Wave (mmW) signals. There are a variety of telecommunication standards that define protocols for communicating mmW signals. One such example is Institute of Electrical and Electronics Engineers (IEEE) 802.11ad, which defines a protocol for communicating wireless signals over a 60 GigaHertz (GHz) carrier frequency. Due to the attenuation characteristics of wireless signals exceeding 30 GHz, mmW signals tend to exhibit high, oftentimes unacceptable, packet loss rates when transmitted over relatively long distances (e.g., distances exceeding one kilometer), and consequently have been used primarily for short-range communications. By way of example, IEEE 802.11ad is generally considered to have a coverage range of approximately ten meters.

SUMMARY OF THE INVENTION

Technical advantages are generally achieved by embodiments of this disclosure which describe a frame structure to support long distance transmission.

In accordance with an embodiment, a method includes transmitting, by a station (STA), at least a first frame including one or more short training fields (STFs) and a legacy STF, wherein each of the one or more STFs is orthogonal to the legacy STF. An apparatus for performing this method is also provided.

In accordance with another embodiment, a method for extended wireless coverage includes transmitting, by a station (STA), at least a first frame including a first group of control fields and a second group of control fields (e.g. channel estimation and header fields), the first group of control fields and the second group of control fields being communicated over non-overlapping time-periods, wherein at least one control field in the first group of control fields is duplicated in the second group of control fields.

In accordance with another embodiment, a method for extended wireless coverage includes transmitting, by a station (STA), at least a first frame including one or more short training fields (STFs) and a legacy STF, wherein each of the one or more STFs is orthogonal to the legacy STF, the first frame also including a first group of control fields and a second group of control fields, the first group of control fields and the second group of control fields being communicated over non-overlapping time-periods, wherein at least one control field in the first group of control fields is duplicated in the second group of control fields.

In accordance with another embodiment, an apparatus includes a transmitter having a processor and a computer readable storage medium storing programming for execution by the processor, the programming including instructions to transmit at least a first frame, the first frame including one or more short training fields (STFs) and a legacy STF, wherein each of the one or more STFs is orthogonal to the legacy STF, the first frame also including a first group of control fields and a second group of control fields, the first group of control fields and the second group of control fields being communicated over non-overlapping time-periods, wherein at least one control field in the first group of control fields is duplicated in the second group of control fields.

BRIEF DESCRIPTION OF THE DRAWINGS

For a more complete understanding of the present disclosure, and the advantages thereof, reference is now made to the following description taken in conjunction with the accompanying drawings, in which:

FIGS. 8A and 8B are flowcharts of first embodiment methods;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
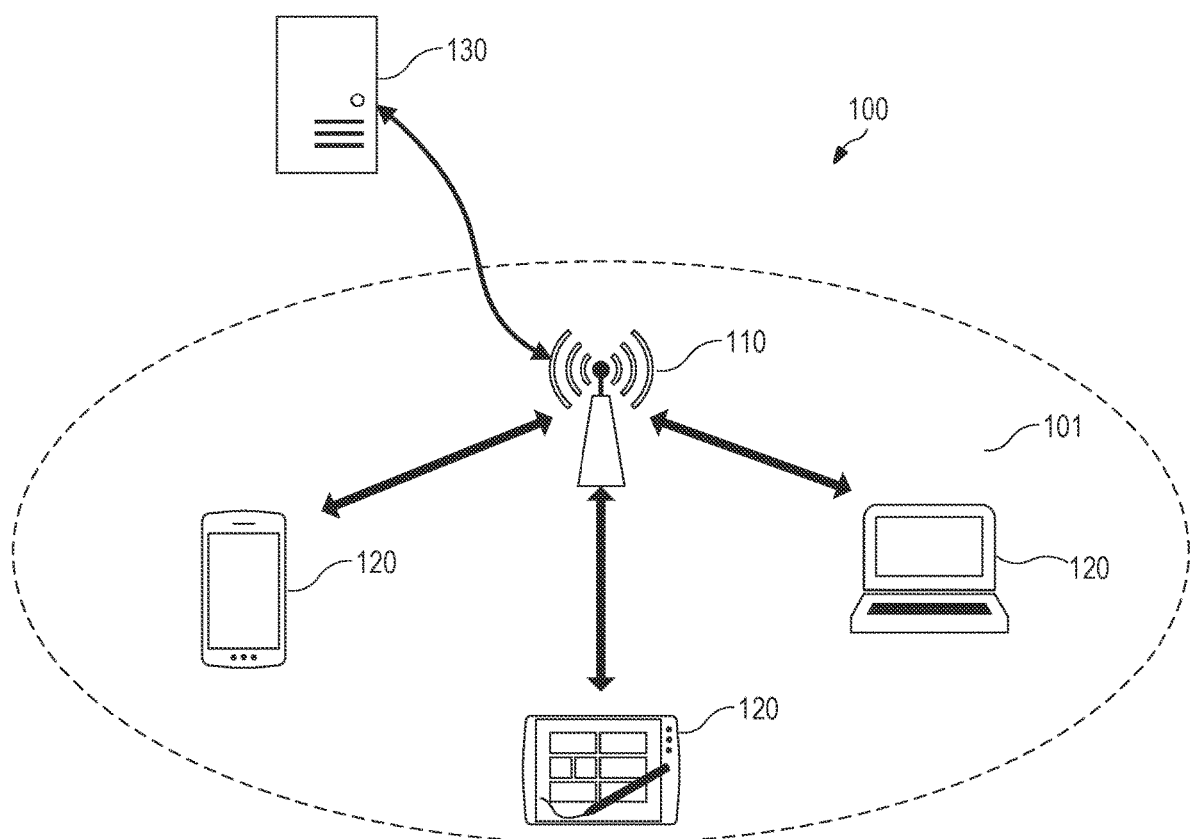
FIG. 1 is a diagram of a wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims. Although many inventive aspects provided herein are discussed in the context of wireless signals communicated over a 60 GHz carrier frequency, it should be appreciated that the inventive aspects can be applied to other carrier frequencies, including comparatively lower frequencies, such as 2.5 GHz and 5 GHz carrier frequencies. The inventive aspects can also be applied to carrier frequencies in excess of 60 GHz.

IEEE 802.11ay is being developed as an extension to IEEE 802.11ad. One goal of IEEE 802.11ay is to increase the effective range of wireless signals transmitted over a 60 GHz carrier frequency. Embodiments provided herein increase the range of signals by including multiple short training fields (STFs) in frames carried by those signals. In particular, including multiple STFs in a frame may allow the receiver to achieve improved automatic gain control (AGC), which may in turn increase the likelihood that the receiver will be able to successfully decode the frame's payload. In one embodiment, a frame carries a legacy STF and one or more next-generation STFs. The legacy STF may have a format, sequence, or structure that is recognizable by stations (STAs) configured to communicate in accordance with IEEE 802.11ad, and each of the one or more next-generation STFs may have a format, sequence, or structure that is recognizable by STAs configured to communicate in accordance with IEEE 802.11ay, but is not recognizable by legacy STAs that are not configured to communicate in accordance with IEEE 802.11ay. By way of example, each of the one or more next-generation STFs may carry a sequence of symbols that is orthogonal to a sequence of symbols carried by the legacy STF. One sequence of symbols may be orthogonal to another sequence of symbols when there is zero or near zero cross-correlation between the respective sequences. Using orthogonality, the legacy STF may be detectable by legacy STAs that are not compatible with IEEE 802.11ay as well as by next-generation STAs that are compatible with IEEE 802.11ay. The next-generation STFs may be detectable by the next-generation STAs while going undetected by legacy STAs, which may be advantageous, for example to enable legacy STAs to avoid attempting to process next-generation frames.

Additional embodiments provided herein increase the range of signals by including multiple field groups in frames carried by those signals, where each field group includes, for example, a channel estimation (CE) field, a header field and an extension header (Ext-Header) field. In particular, including multiple field groups in a frame may increase the probability that the receiver is able to accurately receive and process these fields. This increases the probability that the receiver would be able to accurately receive and decode the payload of the frame. In one embodiment, at least one of the field groups includes some or all of a legacy CE, legacy header and Ext-Header fields. The legacy CE, legacy header and Ext-Header fields may have a format, sequence, or structure that is recognizable by STAs configured to communicate in accordance with IEEE 802.11ad. By way of example, providing multiple field groups where each field group includes a CE field increases the probability that a next generation STA configured to communicate using IEEE802.11ay, for example, can accurately receive the CE field and perform channel estimation. In addition, as another example, if the next generation STA is able to accurately receive more than one CE field, the next generation STA may be able to perform a joint channel estimation using these received CE fields, thus improving the accuracy of estimating the channel function, which in turn improves the performance of the access point to STA link. These and other details are described in greater detail below.

FIG. 1 is a diagram of a wireless communications network 100. The wireless communications network 100 comprises an access point 110 having a coverage area 101, a plurality of stations (STAs) 120, which may be fixed or mobile, and a backhaul network 130. As shown, the access point 110 establishes uplink and/or downlink connections with STAs 120, which serve to communicate between the STAs 120 and access point 110. Data carried over the uplink/downlink connections may include data communicated between the STAs 120, as well as data communicated to/from a remote-end (not shown) by way of the backhaul network 130. As used herein, the term "access point" refers to any component (or collection of components) configured to provide wireless access to a network, such as a Wi-Fi access point (AP), an evolved NodeB (eNB), a macro-cell, a femtocell, or other wirelessly enabled devices. Access points may provide wireless access in accordance with one or more wireless communication protocols, e.g., Wi-Fi IEEE 802.11a/b/g/n/ac/ad/ay, Long Term Evolution (LTE), LTE advanced (LTE-A), High Speed Packet Access (HSPA). As used herein, the term "STA" refers to any component (or collection of components) capable of establishing a wireless connection with a access point, such as a user equipment (UE), a mobile device, and other wirelessly enabled devices. In some embodiments, the network 100 may comprise various other wireless devices, such as relays, low power nodes, etc. In some embodiments, user-side devices may be referred to as non-AP STAs.

Figure 2:
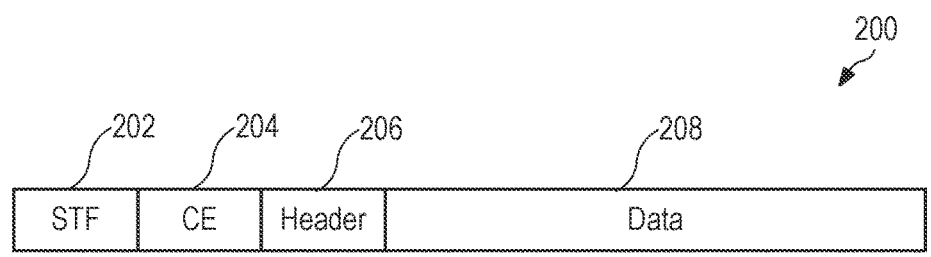
FIG. 2 is a diagram of a frame structure for IEEE 802.11ad.

FIG. 2 is a diagram of a frame 200. The frame structure of the frame 200 may be similar to that defined by IFEE 802.11ad. The frame 200 includes an STF 202, a channel estimation (CE) field 204, a header 206, and a payload 208. The STF 202 and the CE field 204 may carry control signaling that is a priori information to STAs configured to communicate in accordance with IEEE 802.11ad. In particular, STAs may use measurements obtained from control signaling carried in the STF 202 for AGC when decoding portions of the frame following the STF 202, e.g., the CE field 204, the header 206, the payload 208, etc. AGC is a signal processing technique that is used to account for fluctuations in signal amplitude. AGC may be particularly beneficial when decoding signals experiencing high path loss, because those signals tend to experience relatively large fluctuations in amplitude. STAs use measurements obtained from control signaling carried in the CE field 204 for channel estimation when decoding remaining portions of the frame, e.g., the header 206, the payload 208, etc. Channel estimation is a signal processing technique that is used to account for signal distortion that occurs when a signal propagates over a channel. The header 206 carries control information (e.g., modulation coding scheme (MCS) parameters, etc.) that is used to decode the payload 208. The payload 208 carries data.

Figure 3:
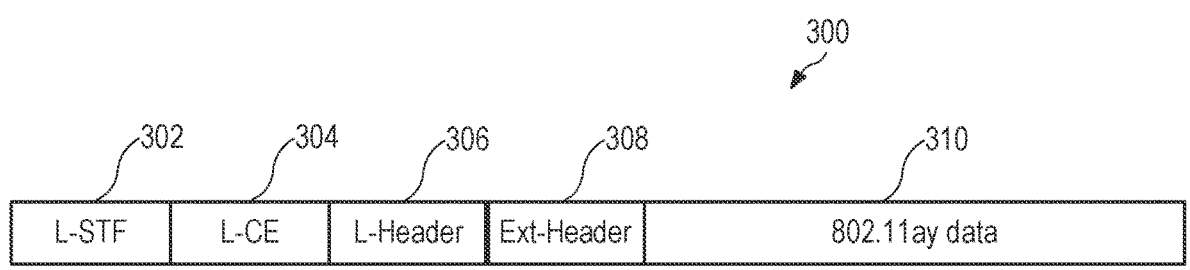
FIG. 3 is a diagram of an proposed frame structure for IEEE 802.11ay.

Frame configurations for IEEE 802.11ay may carry additional control information for decoding of the payload by next-generation STAs. FIG. 3 is a diagram of a frame 300 that includes a legacy STF (L-SIF) 302, a legacy CE (L-CE) field 304, a legacy header (L-Header) 306, an extension header (Ext-Header) 308, and a payload 310. One or more fields in the frame 300 may be detectable by STAs configured to communicate in accordance with IEEE 802.11ad. This may allow the frame 300 to be backward compatible with IEEE 802.11ad so that the frame 300 can carry data to legacy STAs as well as next-generation STAs. In one example, the L-STF 302, the L-CE 304, and the L-Header 306 are similar to the STF 202, the CE 204, and the header 206 (respectively) of the frame 200. The frame 300 may also carry fields that are detectable by STAs configured to communicate in accordance with IEEE 802.11ay. In some implementations, those fields may go undetected, or otherwise be disregarded, by STAs that are not compatible with IEEE 802.11ay, such as legacy STAs. In one example, the Ext-Header 308 carries control information that facilitates decoding of the payload 310 by next-generation STAs. The Ext-Header 308 may carry the same control information as the L-Header 306, but at a different MCS level, e.g., a lower coding rate. This may increase the likelihood that control information in the Ext-Header 308 will be successfully decoded by STAs that receive the frame 300 over high path loss channels, as may be the case when the frame 300 is communicated over relatively long distances, e.g., exceeding 1 kilometer (km). The Ext-Header 308 may also carry control information that is not carried in the L-Header 306.

Figure 4:
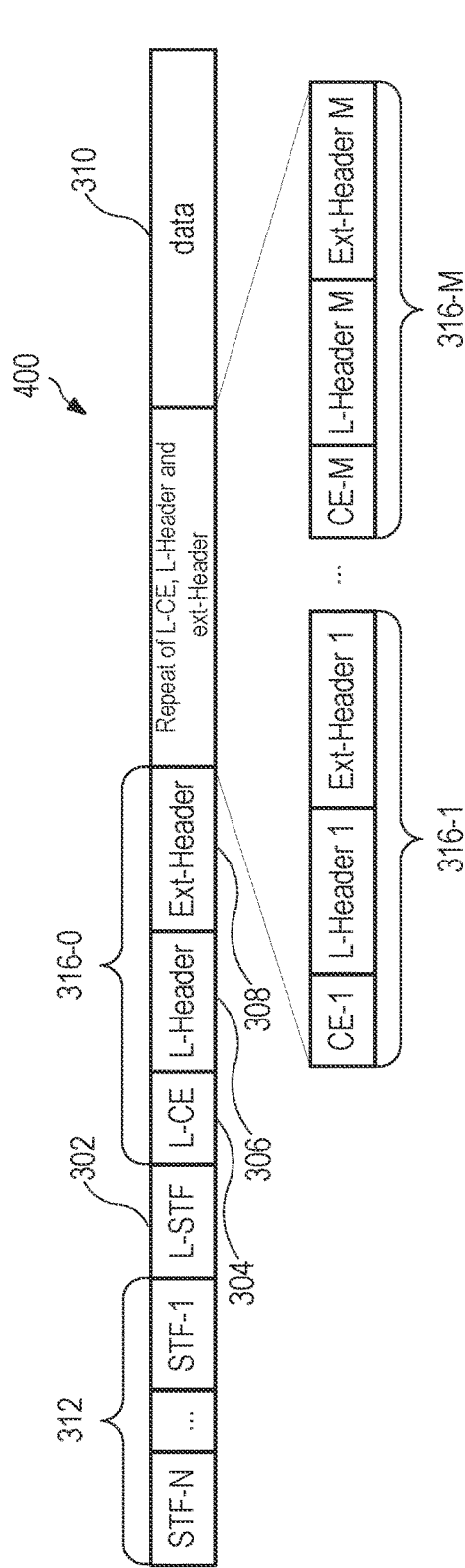
FIG. 4 is a diagram of a first embodiment frame structure.

Embodiment frame configurations for IEEE 802.11ay implementations are provided herein. FIG. 4 is a diagram of a frame 400 that includes N STFs 312, an L-STF 302, M field groups 316, and a payload 310. N and M are integers greater than 1 that may be predetermined or may be set dynamically in order to adjust for changing transmission conditions. Each of the M field groups 316 includes a CE, an L-Header, and an Ext-leader. Frame 400 begins with N STFs 312. STFs 312 are designed for use in "next generation" or subsequent generation frame structures. For example, L-STF 302 may be designed to allow for reception by STAs using the IEEE 802.11ad standard and STFs 312 may be designed for use by STAs using the IEEE 802.11ay standard. The terms "legacy" and "next generation" are used herein solely to indicate that certain fields, such as STFs 312, are directed to one communication protocol and other fields, such as L-STF 302, are directed to another communication protocol in order to allow for communication under either protocol. That is, the described embodiments of the invention allow for functionality using different protocols.

The N STFs 312 are each configured to be orthogonal to L-STF 302. "Orthogonal" as used herein means that there is zero or near zero cross correlation between two fields, such as between any of STFs 312 and L-STF 302. This allows for backward compatibility with devices using a legacy standard, such as IEEE 802.11ad. Upon receiving frame 400, a legacy STA attempting to detect a using correlation properties will not detect a training field with a nonzero correlation with STFs 312 because STFs 312 are orthogonal to L-STF 302. Thus, a legacy device will not process STFs 312. On the other hand, a legacy STA will recognize L-STF 302 and thus it will be able to synchronize with frame 400 and perform AGC.

N STFs 312 are provided in frame 400 to increase the probability that synchronization can be achieved by a next generation STA, even with significant path loss. In one embodiment, each of STFs 312 comprises the same series of symbols. In another embodiment, some of STFs 312 are the same and some are not. Any of STFs 312 may or may not be orthogonal with each other.

L-STF 302 is followed in frame 400 by M+1 field groups 316-0 through 316-M. Each of the field groups is transmitted subsequent to the previous field group, and thus the field groups do not overlap in time. Each of field groups 316-0 through 316-M includes a CE field, an L-Header and an Ext-Header. The first group 316-0 includes an L-CE field 304, an L-header 306 and an Ext-Header 308, and thus includes the preamble fields necessary for a legacy STA to receive frame 400. Groups 316-1 through 316-M each include a CE field, an L-Header and an Ext-Header. The CE field in groups 316-1 through 316-M may be the same as L-CE 304 repeated, they may all be different from L-CE 304 and each other, or they may be a mix of repeated fields and different fields. With long distances in a high attenuation environment, path loss may significant (i.e., the signal to interference and noise ratio (SINR) is low). The repetition of the channel estimation fields can increase the probability that the receiver will be able decode and process at least one CE field in order to accurately determine the channel response function, and thus be able to receive frame 400. In addition, if more than one CE field is received, joint channel estimation may be performed to increase the accuracy of the channel estimation.

Each of field groups 316-1 through 316-M also includes an L-Header and an Ext-Header. These two fields may or may not be identical to the corresponding fields in group 316-0 and/or to the corresponding fields ire other field groups within 316-1 through 316-M. Providing M L-Header and Ext-Header fields increases the probability that the information in those fields will be accurately detected and decoded by a next generation STA in a poor SINR environment.

Figure 5:
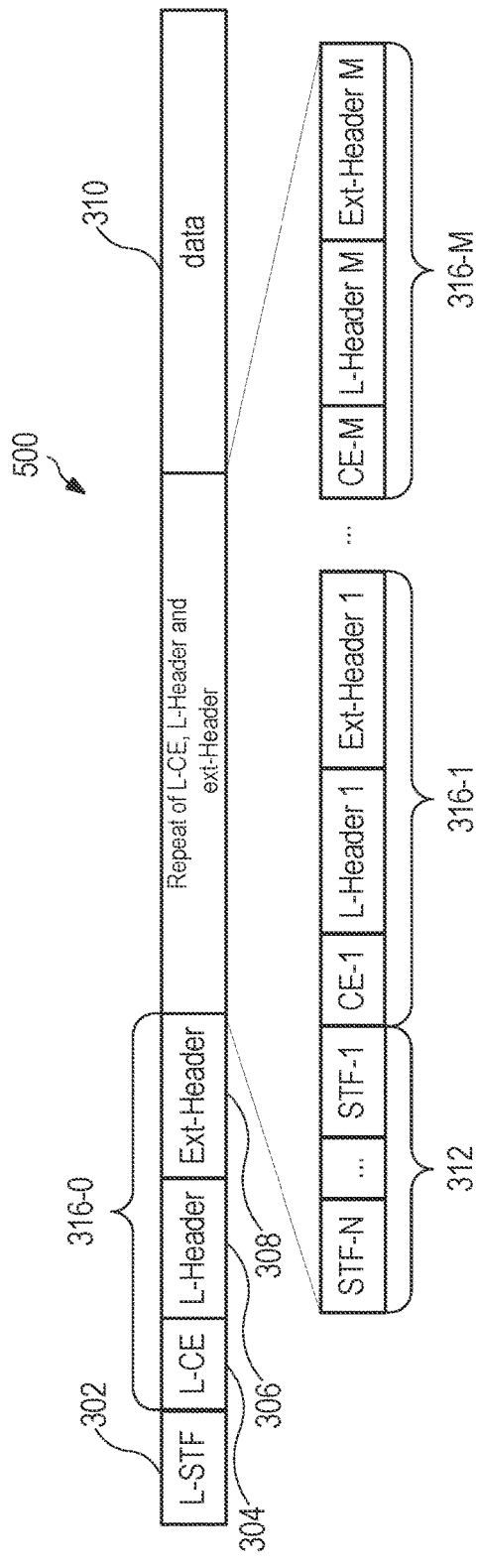
FIG. 5 is a diagram of a second embodiment frame structure.

FIG. 5 is a diagram of frame 500, which is another embodiment frame structure used in another embodiment of the present invention. The frame 500 begins with an L-STF 302, followed by a field group 316-0 that includes L-CE 304, L-Header 306 and Ext-Header 308, which is followed by N STF fields 312 and M field groups 316-1 through 316-M. Each of the field groups is transmitted subsequent to the previous field group, and thus the field groups do not overlap in time. Each field group includes a CE field, an L-Header and an Ext-Header. The field group 316-M is followed by payload 310. Frame 500 begins with L-STF 302, L-CE 304, L-Header 306 and Ext-Header 308, and thus includes the fields necessary for a legacy STA to receive and decode frame 500. Field group 316-0 is followed by N STFs 312. N is an integer greater than or equal to 1. N may be predetermined or may be dynamically assigned in order to adjust for changing transmission conditions. As with frame 400 in FIG. 4, STFs 312 are orthogonal to L-STF 302. STFs 312 are followed by field groups 316-1 through 316-M. M is also an integer greater than 1 and may also be predetermined or dynamically assigned in order to adjust for changing transmission conditions. Each of field groups 316-1 through 316-M includes a CE field, which may or may not be the same as L-CE field 304, and which may or may not be the same as other CE fields in field groups 316-1 through 316-M. As with field groups 316-1 through 316-M of FIG. 4, each group of field groups 316-1 through 316-M also includes an L-Header and an Ext-Header. As noted above, these two fields may or may not be identical to the corresponding L-Header and Ext-Header fields, respectively, in group 316-0, and which may or may not be the same as other L-Header and Ext-Header fields, respectively, in field groups 316-1 through 316-M.

As with frame 400, frame 500 includes N STFs 312 to increase the probability that synchronization and AGC can be achieved by a next generation STA, even with significant path loss. N is an integer greater than or equal to 1 that may be predetermined or may be set dynamically in order to adjust for changing transmission conditions. In one embodiment, each of STFs 312 comprises the same series of symbols. In another embodiment, some of STFs 312 are the same and some are not. Any of STFs 312 may or may not be orthogonal with each other. In addition, frame 500 includes M+1 field groups 316-0 through 316-M to increase the probability that a next generation STA will be able to accurately receive and decode these fields.

Figure 6:
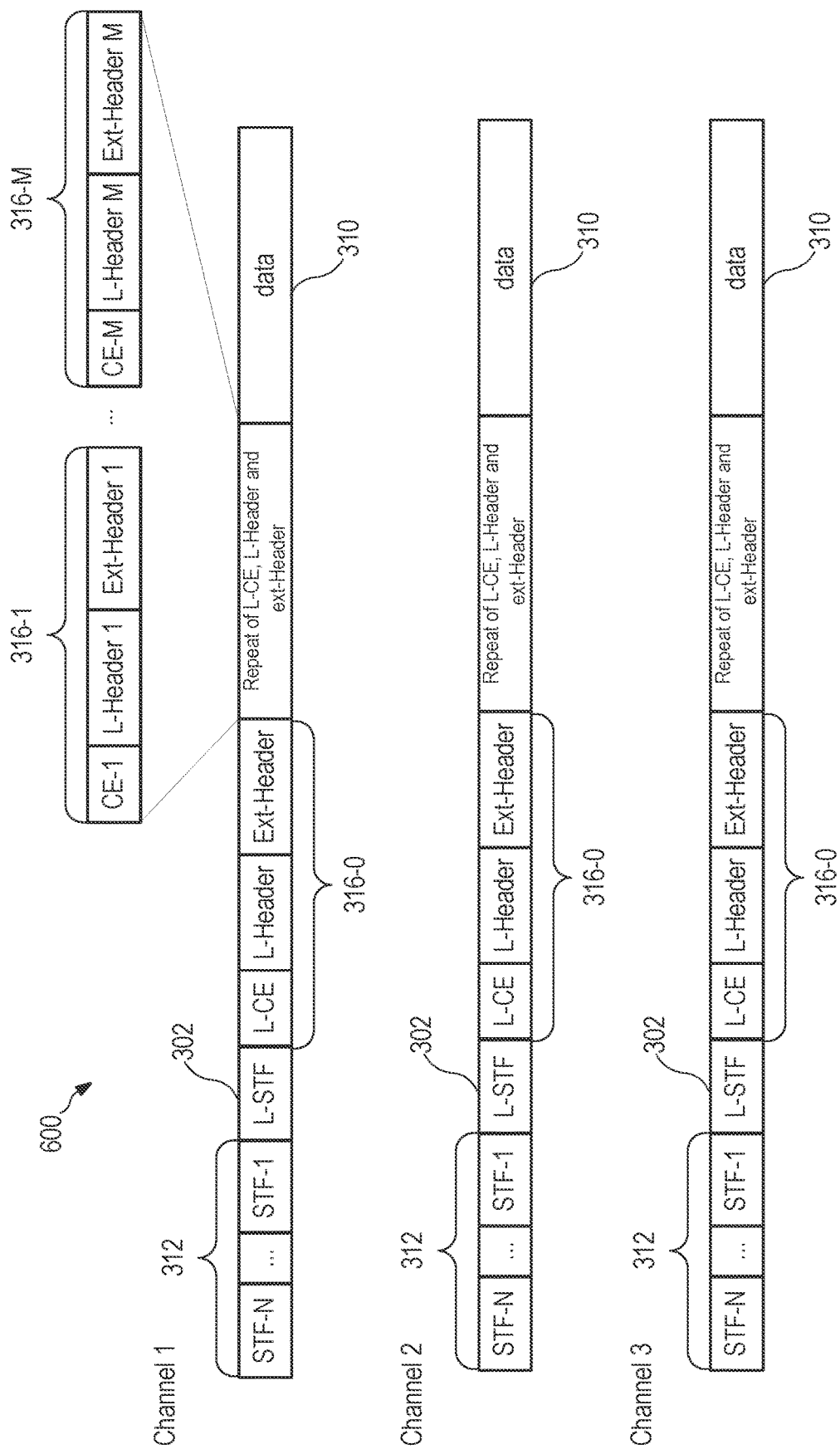
FIG. 6 is a diagram of a third another embodiment frame structure.

FIG. 6 is a diagram of frame 600, which is another embodiment frame structure for use in another embodiment of the present invention. Frame 600 is transmitted over three channels with the subframe structure in each channel including N STFs 312, an L-STF field 302, and M field groups 316, and payload 310. Each field group includes a CE, an L-Header and an Ext-Header. The subframe structure for each channel of multi-channel frame 600 is the same as frame 400 of FIG. 4. The data in payloads 310 for each channel may be the same as each other, to provide for redundancy, or different, to provide greater throughput.

Figure 7:
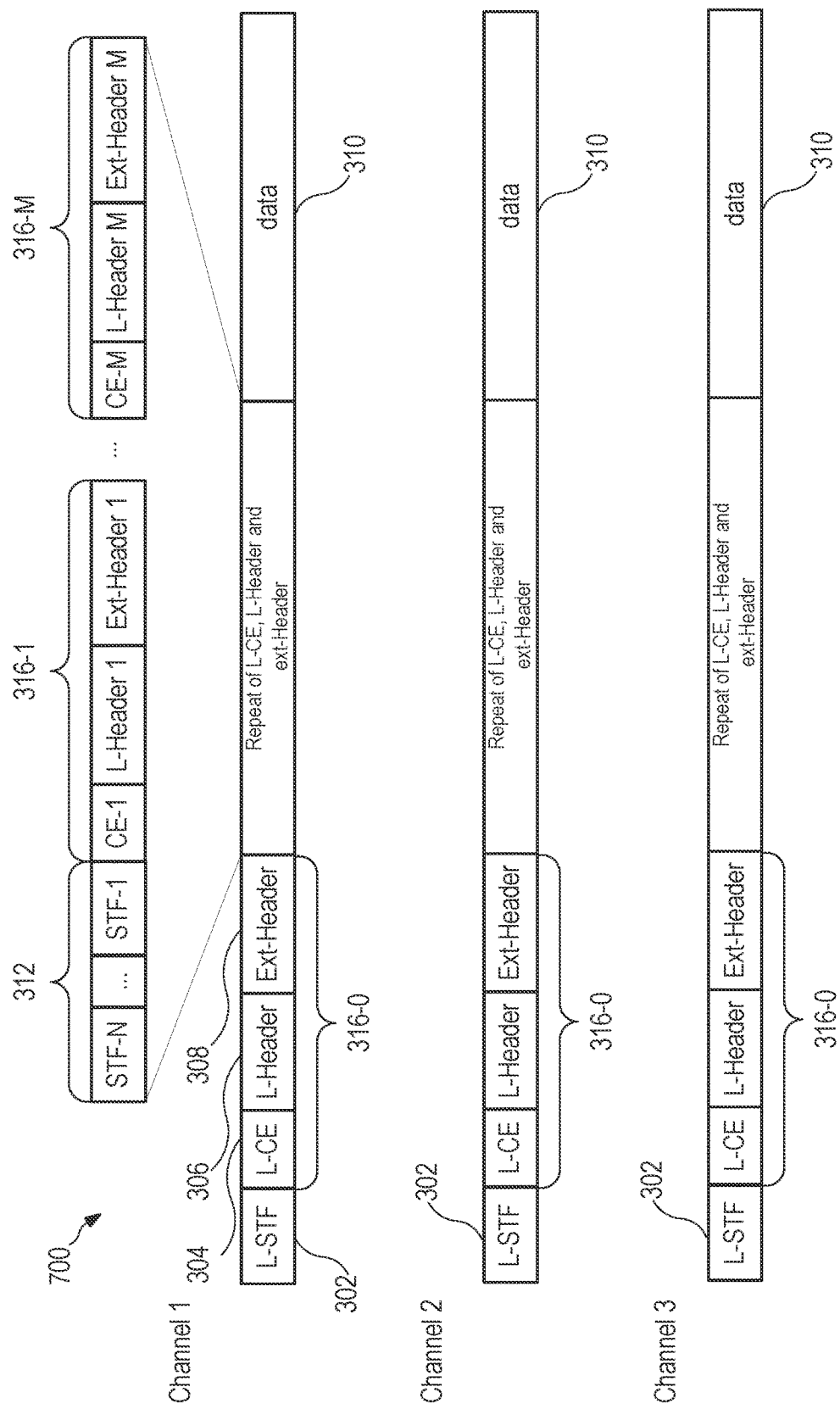
FIG. 7 is a diagram of a fourth embodiment frame structure.

FIG. 7 is a diagram of frame 700, which is another embodiment frame structure for use in an embodiment of the present invention. Frame 700 is transmitted over three channels with the subframe structure in each channel including an L-STF 302, followed by a group 316-0 that includes L-CE 304, L-Header 306 and Ext-Header 308, which is followed by N STF fields 312 and M field groups 316-1 through 316-M, where each field group includes a CE field, an L-Header and an Ext-Header, which are followed by payload 310. The subframe structure for each channel of multi-channel frame 700 is the same as frame 500 of FIG. 5. The data in payloads 310 for each channel may be the same as each other, to provide for redundancy, or different, to provide greater throughput.

FIGS. 8a and 8b are flowcharts of embodiment methods 800a and 800b. Method 800a is a process for transmitting a frame, and includes the step 802 of transmitting, by a wireless device, in a first frame, one or more short training fields (STFs). In step 804, a legacy STF that is orthogonal to the one or more STFs is transmitted by the wireless device. In optional step 806, a first group of control fields is transmitted by the wireless device. In optional step 808, a second group of control fields is transmitted by the wireless device, where at least one control field in the first group is duplicated in the second group of control fields. Method 800b is a process for transmitting a frame, and includes the step 812 of transmitting, by a wireless device, in a first frame, a legacy short training field (STF). In step 814, one or more STFs that are orthogonal to the legacy STF is transmitted by the wireless device. In optional step 816, a first group of control fields is transmitted by the wireless device. In optional step 818, a second group of control fields is transmitted by the wireless device, where at least one control field in the first group is duplicated in the second group of control fields.

Figure 9A:
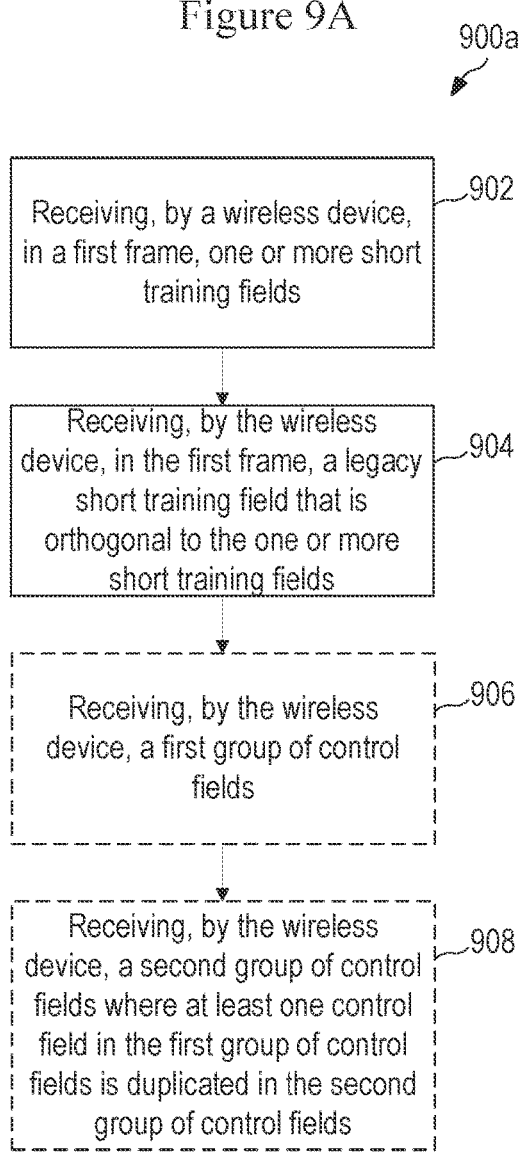
FIGS. 9A and 9B are flowcharts of second embodiment methods.
Figure 9B:
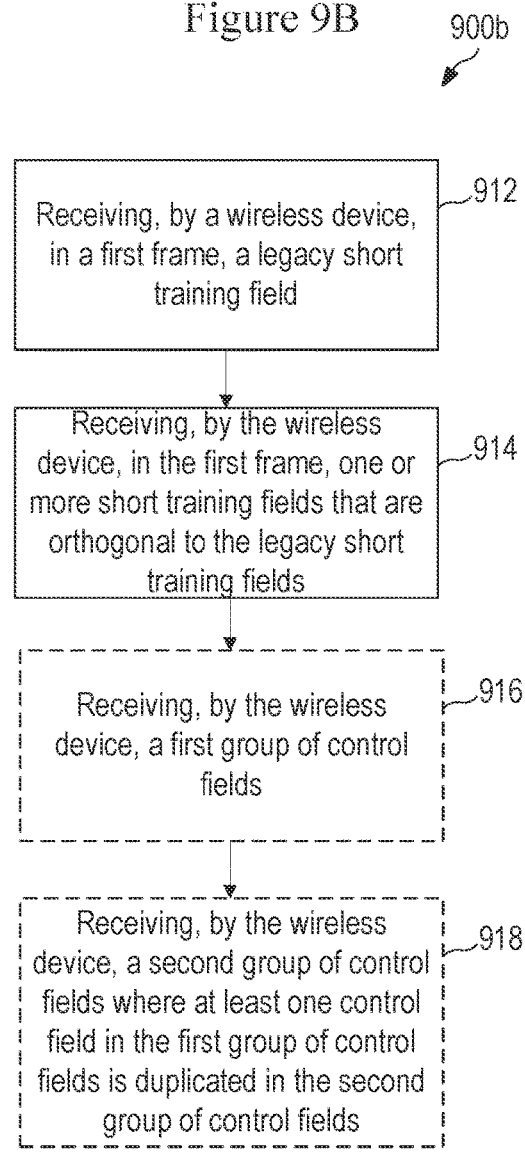

FIGS. 9a and 9b are flowcharts of embodiment methods 900a and 900b. Method 900a is a process for receiving a frame, and includes the step 902 of receiving, by a wireless device, in a first frame, one or more short training fields (STFs). In step 904, a legacy STF that is orthogonal to the one or more STFs is received by the wireless device. In optional step 906, a first group of control fields is received by the wireless device. In optional step 908, a second group of control fields is received by the wireless device, where at least one control field in the first group is duplicated in the second group of control fields. Method 900b is a process for receiving a frame, and includes the step 912 of receiving, by a wireless device, in a first frame, a legacy short training field (STF). In step 914, one or more STFs that are orthogonal to the legacy STF are received by the wireless device. In optional step 916, a first group of control fields is received by the wireless device. In optional step 918, a second group of control fields is received by the wireless device, where at least one control field in the first group is duplicated in the second group of control fields.

Figure 10:
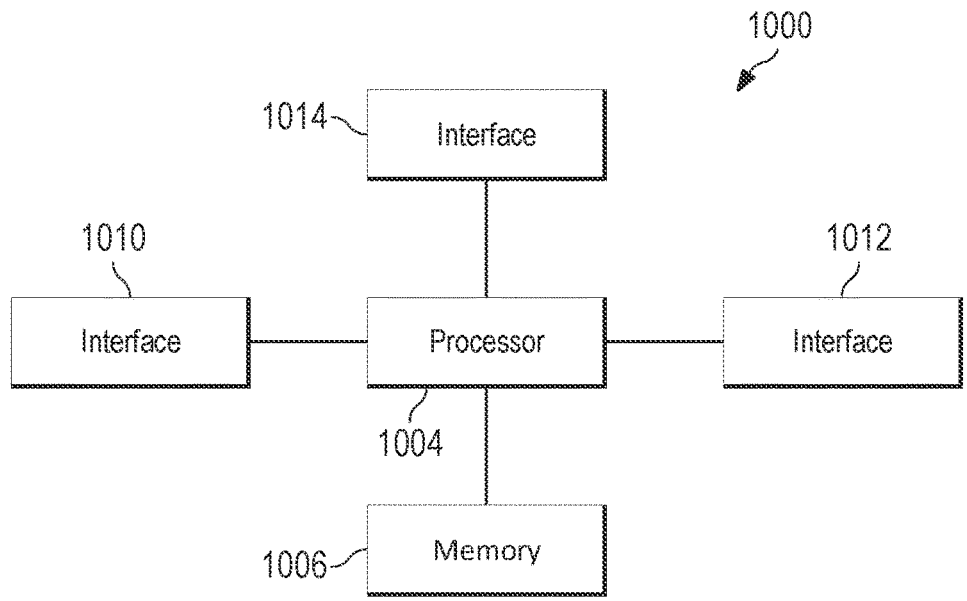
FIG. 10 is diagram of an embodiment processing system.

FIG. 10 is a diagram of an embodiment processing system 1000 for performing methods described herein, which may be installed in access point 110 and/or mobile devices 120. As shown, the processing system 1000 includes a processor 1004, a memory 1006, and interfaces 1010-1014, which may (or may not) be arranged as shown in FIG. 10. The processor 1004 may be any component or collection of components adapted to perform computations and/or other processing related tasks, and the memory 1006 may be any component or collection of components adapted to store programming and/or instructions for execution by the processor 1004. In an embodiment, the memory 1006 includes a non-transitory computer readable medium. The interfaces 1010, 1012, 1014 may be any component or collection of components that allow the processing system 1000 to communicate with other devices/components and/or a user. For example, one or more of the interfaces 1010, 1012, 1014 may be adapted to communicate data, control, or management messages from the processor 1004 to applications installed on the host device and/or a remote device. As another example, one or more of the interfaces 1010, 1012, 1014 may be adapted to allow a user or user device (e.g., personal computer (PC), etc.) to interact/communicate with the processing system 1000. The processing system 1000 may include additional components not depicted in FIG. 10, such as long term storage (e.g., non-volatile memory, etc.).

In some embodiments, the processing system 1000 is included in a network device that is accessing, or part otherwise of a telecommunications network. In one example, the processing system 1000 is in a network-side device in a wireless or wireline telecommunications network, such as a base station, a relay station, a scheduler, a controller, a gateway, a router, an applications server, or any other device in the telecommunications network. In other embodiments, the processing system 1000 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 11:
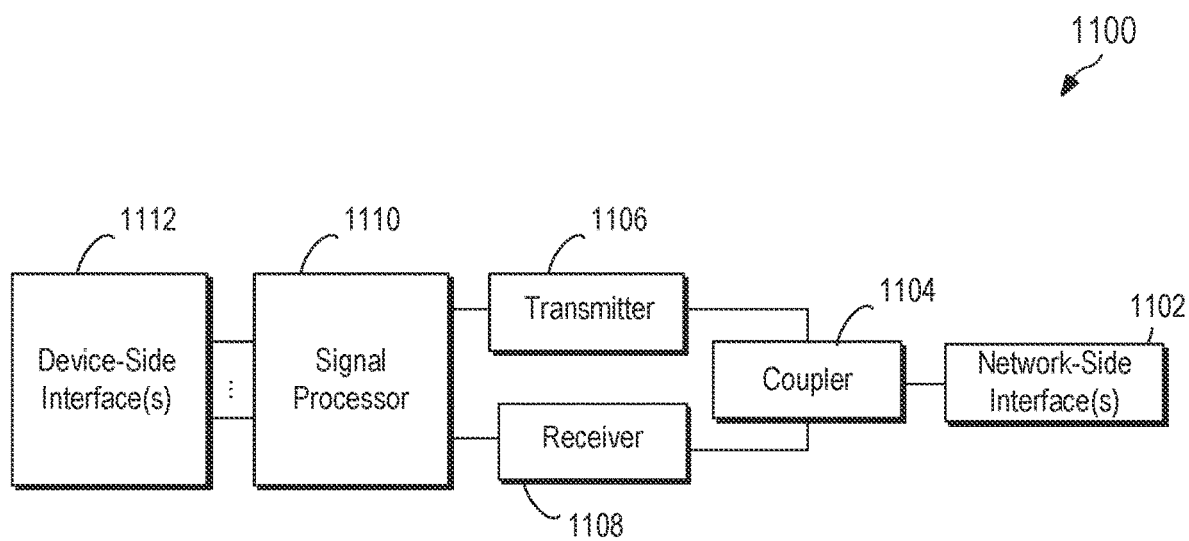
FIG. 11 is a diagram of an embodiment transceiver.

In some embodiments, one or more of the interfaces 1010, 1012, 1014 connects the processing system 1000 to a transceiver adapted to transmit and receive signaling over the telecommunications network. FIG. 11 illustrates a block diagram of a transceiver 1100 adapted to transmit and receive signaling over a telecommunications network. The transceiver 1100 may be installed in access point 110 and/or mobile devices 120. As shown, the transceiver 1100 comprises a network-side interface 1102, a coupler 1104, a transmitter 1106, a receiver 1108, a signal processor 1110, and a device-side interface 1112. The network-side interface 1102 may include any component or collection of components adapted to transmit or receive signaling over a wireless or wireline telecommunications network. The coupler 1104 may include any component or collection of components adapted to facilitate bi-directional communication over the network-side interface 1102. The transmitter 1106 may include any component or collection of components (e.g., up-converter, power amplifier, etc.) adapted to convert a baseband signal into a modulated carrier signal suitable for transmission over the network-side interface 1102. The receiver 1108 may include any component or collection of components (e.g., down-converter, low noise amplifier, etc.) adapted to convert a carrier signal received over the network-side interface 1102 into a baseband signal. The signal processor 1110 may include any component or collection of components adapted to convert a baseband signal into a data signal suitable for communication over the device-side interface(s) 1112, or vice-versa. The device-side interface(s) 1112 may include any component or collection of components adapted to communicate data-signals between the signal processor 1110 and components within the host device (e.g., the processing system 1000, local area network (LAN) ports, etc.).

The transceiver 1100 may transmit and receive signaling over any type of communications medium. In some embodiments, the transceiver 1100 transmits and receives signaling over a wireless medium. For example, the transceiver 1100 may be a wireless transceiver adapted to communicate in accordance with a wireless telecommunications protocol, such as a cellular protocol (e.g., long-term evolution (LTE), etc.), a wireless local area network (WLAN) protocol (e.g., etc.), or any other type of wireless protocol (e.g., Bluetooth, near field communication (NFC), etc.). In such embodiments, the network-side interface 1102 comprises one or more antenna/radiating, elements. For example, the network-side interface 1102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1100 transmits and receives signaling over a wireline medium, e.g., twisted-pair cable, coaxial cable, optical fiber, etc. Specific processing systems and/or transceivers may utilize all of the components shown, or only a subset of those components, and levels of integration may vary from device to device.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for wireless communication, the method comprising:
   transmitting, by a wireless transmission device, a frame including a legacy short training field (STF), one or more STFs, a legacy channel estimation field, and one or more channel estimation fields, each of the one or more STFs being orthogonal to the legacy STF based on cross-correlation between the legacy STF and the one or more STFs, the legacy STF and the one or more STFs being used for at least one of automatic gain control and synchronization, wherein a number of the one or more STFs and a number of the one or more channel estimation fields are dynamically configured according to changing transmission conditions, the changing transmission conditions including at least one of signal amplitude, path loss, and channel attenuation, and wherein the legacy STF is directed to a first communication protocol and the one or more STFs are directed to a second communication protocol in order to allow for communication under either protocol or allow for functionality using different protocols.

2. The method of claim 1, wherein the legacy STF is to be received and used by a legacy station for automatic gain control and synchronization, and wherein the one or more STFs are to be received and used by a next-generation station for automatic gain control and synchronization.

3. The method of claim 1, wherein the legacy STF is to be received and used by a legacy station for automatic gain control and synchronization, and wherein both the legacy STF and the one or more STFs are to be received and used by a next-generation station for automatic gain control and synchronization.

4. The method of claim 3, wherein the legacy station is compatible with the first communication protocol, and wherein the next-generation station is compatible with the second communication protocol.

5. The method of claim 1, wherein the one or more STFs are the same.

6. The method of claim 1, wherein at least two of the one or more STFs are the same, and wherein at least two of the one or more STFs are different.

7. The method of claim 1, wherein the one or more STFs are orthogonal to each other.

8. The method of claim 1, wherein none of the one or more STFs are orthogonal to each other.

9. The method of claim 1, wherein the one or more STFs are transmitted before the legacy STF and a legacy header field are transmitted.

10. A method for wireless communication, the method comprising:
    receiving, by a wireless receiving device, a frame including a legacy short training field (STF), one or more STFS, a legacy channel estimation field, and one or more channel estimation fields, each of the one or more STFs being orthogonal to the legacy STF based on cross-correlation between the legacy STF and the one or more STFs, the legacy STF and the one or more STFS being used for at least one of automatic gain control and synchronization, wherein a number of the one or more STFs and a number of the one or more channel estimation fields are dynamically configured according to changing transmission conditions, the changing transmission conditions including at least one of signal amplitude, path loss, and channel attenuation, and wherein the legacy STF is directed to a first communication protocol and the one or more STFs are directed to a second communication protocol in order to allow for communication under either protocol or allow for functionality using different protocols.

11. The method of claim 10, wherein the wireless receiving device is a next-generation station compatible with the second communication protocol, wherein both the legacy STF and the one or more STFs are received and used by the wireless receiving device for automatic gain control and synchronization, and wherein the legacy STF is to be received and used by a legacy station compatible with the first communication protocol for automatic gain control and synchronization.

12. The method of claim 10, wherein at least two of the one or more STFs are the same, and wherein at least two of the one or more STFs are different.

13. The method of claim 10, wherein the one or more STFs are received before the legacy STF and a legacy header field are received.

14. A device comprising:
    a non-transitory memory storage comprising instructions; and
    one or more processors in communication with the non-transitory memory storage, wherein the one or more processors execute the instructions to:
    transmit a frame including a legacy short training field (STF), one or more STFs, a legacy channel estimation field, and one or more channel estimation fields, each of the one or more STFs being orthogonal to the legacy STF based on cross-correlation between the legacy STF and the one or more STFs, the legacy STF and the one or more STFs being used for at least one of automatic gain control and synchronization, wherein a number of the one or more STFs and a number of the one or more channel estimation fields are dynamically configured according to changing transmission conditions, the changing transmission conditions including at least one of signal amplitude, path loss, and channel attenuation, and wherein the legacy STF is directed to a first communication protocol and the one or more STFs are directed to a second communication protocol in order to allow for communication under either protocol or allow for functionality using different protocols.

15. The device of claim 14, wherein the legacy STF is to be received and used by a legacy station compatible with the first communication protocol for automatic gain control and synchronization, and wherein both the legacy STF and the one or more STFs are to be received and used by a next-generation station compatible with the second communication protocol for automatic gain control and synchronization.

16. The device of claim 14, wherein at least two of the one or more STFs are the same, and wherein at least two of the one or more STFs are different.

17. The device of claim 14, wherein the one or more STFs are transmitted before the legacy STF and a legacy header field are transmitted.

18. A device comprising:
a non-transitory memory storage comprising instructions; and
one or more processors in communication with the non-transitory memory storage, wherein the one or more processors execute the instructions to:
receive a frame including a legacy short training field (STF), one or more STFs, a legacy channel estimation field, and one or more channel estimation fields, each of the one or more STFs being orthogonal to the legacy STF based on cross-correlation between the legacy STF and the one or more STFs, the legacy STF and the one or more STFs being used for at least one of automatic gain control and synchronization, wherein a number of the one or more STFs and a number of the one or more channel estimation fields are dynamically configured according to changing transmission conditions, the changing transmission conditions including at least one of signal amplitude, path loss, and channel attenuation, and wherein the legacy STF is directed to a first communication protocol and the one or more STFs are directed to a second communication protocol in order to allow for communication under either protocol or allow for functionality using different protocols.

19. The device of claim 18, wherein the device is a next-generation station compatible with the second communication protocol, wherein both the legacy STF and the one or more STFs are received and used by the device for automatic gain control and synchronization, and wherein the legacy STF is to be received and used by a legacy station compatible with the first communication protocol for automatic gain control and synchronization.

20. The device of claim 18, wherein at least two of the one or more STFs are the same, and wherein at least two of the one or more STFs are different.

21. The device of claim 18, wherein the one or more STFs are received before the legacy STF and a legacy header field are received.

* * * * *

UNITED STATES PATENT AND TRADEMARK OFFICE
CERTIFICATE OF CORRECTION

PATENT NO. : 11,528,671 B2
APPLICATION NO. : 17/494949
DATED : December 13, 2022
INVENTOR(S) : Tao Wu It is certified that error appears in the above-identified patent and that said Letters Patent is hereby corrected as shown below:

In the Claims

Claim 10, Column 10; Line 25, delete "STFS" and insert --STFs--.
Claim 10, Column 10; Line 30, delete "STFS" and insert --STFs--.

Signed and Sealed this
Seventeenth Day of January, 2023

Katherine Kelly Vidal
*Director of the United States Patent and Trademark Office*